(12) United States Patent
Arseneau (10) Patent No.: US 8,505,374 B1
(45) Date of Patent: Aug. 13, 2013

(54) PORTABLE ON VEHICLE DYNAMOMETER

(75) Inventor: Paul N. Arseneau, Fort Worth, TX (US)

(73) Assignee: Dynocom Industries, Inc., Fort Worth, TX (US)

( * ) Notice: Subject to any disclaimer, the term of this patent is extended or adjusted under 35 U.S.C. 154(b) by 546 days.

(21) Appl. No.: 12/635,694

(22) Filed: Dec. 10, 2009

(51) Int. Cl.
*G01M 17/007* (2006.01)

(52) U.S. Cl.
USPC ........................................ 73/116.05

(58) Field of Classification Search
USPC ............... 73/115.01, 115.07, 115.08, 116.01, 73/116.02, 116.05, 116.06, 116.08, 116.09, 73/116.11
See application file for complete search history.

(56) References Cited

U.S. PATENT DOCUMENTS

| 3,861,204 | A | * | 1/1975 | Fillingim | 73/116.06 |
| 3,940,978 | A | * | 3/1976 | Akkerman et al. | 73/116.09 |
| 4,468,955 | A | * | 9/1984 | Yamasaki et al. | 73/116.06 |
| 5,656,764 | A | * | 8/1997 | Loeffler | 73/1.37 |
| 5,844,145 | A | * | 12/1998 | D'Angelo | 73/862.18 |
| 5,973,274 | A | * | 10/1999 | Zarchy | 177/132 |
| 6,446,501 | B1 | * | 9/2002 | Domeck et al. | 73/146 |
| 7,743,650 | B2 | * | 6/2010 | Engstrom | 73/114.68 |

* cited by examiner

*Primary Examiner* — Eric S McCall
(74) *Attorney, Agent, or Firm* — Mark W Handley (57) ABSTRACT

A portable on vehicle dynamometer (12) has a rigid frame (64), a load shaft (16), and an eddy current brake (24) with a stator (56) connected to the rigid frame (64) and a rotor (54) connected to the load shaft (16). A hub coupling (18) is secured to a first end of the load shaft (16) and connected to the drive shaft. The rigid frame (64) has two outwardly extending support arms (30) for securing in outwardly extending, fixed positions. Two roller assemblies (46) are mounted to a lower end of the rigid frame (64) for multidirectional movement of the dynamometer (12). Preferably the eddy current brake (24) comprises a cylindrically-shaped rotor drum (54) extending exteriorly around the stator (56), and the stator (56) comprises a plurality of stator coils (94) extending exteriorly around the load shaft (16), spaced apart from an interior of the rotor drum (54).

6 Claims, 13 Drawing Sheets

PORTABLE ON VEHICLE DYNAMOMETER

TECHNICAL FIELD OF THE INVENTION

The present invention relates in general to dynamometers, and in particular to a dynamometer for coupling directly an output shaft for measuring power transmitted by the output shaft.

BACKGROUND OF THE INVENTION

Prior art dynamometers have been provided for measuring the power output from drive shafts, such as those for motor vehicles. Typical automotive chassis type dynamometers have rotary drums on top of which the wheels of vehicles are placed. Power is then transferred from an engine, to a drive shaft, to the wheels of the vehicle and then to the rotary drum of the chassis dynamometer. This type of dynamometer requires that the dynamometer either be buried in a garage floor, or that a rack is provided to suspend a vehicle above the dynamometer. Such configurations take up considerable space, and may not be often used. Considerable garage space is also used when hydraulic dynamometers are used, due to the ancillary hydraulic equipment required.

SUMMARY OF THE INVENTION

A portable on vehicle dynamometer ("POD") is provided for determining power output from a drive shaft. The POD has a rigid frame, a load shaft, and an eddy current brake. The eddy current brake has a stator connected to the rigid frame and a rotor connected to the load shaft. The stator is secured around an exterior of the drive shaft. A hub coupling is secured to a first end of the load shaft and connected to the drive shaft for transferring power to the load shaft. The rigid frame has two outwardly extending support arms and arm locks which secure the outwardly extending support arms in fixed positions. Support feet assemblies are mounted to respective ones of outer ends of the support arms. Two roller assemblies are mounted to a lower end of the rigid frame and provide for multidirectional movement of the dynamometer. Preferably the eddy current brake comprises a cylindrically-shaped rotor drum extending exteriorly around the stator, and the stator comprises a plurality of stator coils extending exteriorly around the load shaft, spaced apart from an interior of the rotor drum.

DESCRIPTION OF THE DRAWINGS

For a more complete understanding of the present invention and the advantages thereof, reference is now made to the following description taken in conjunction with the accompanying Drawings in which FIGS. 1 through 14 show various aspects for portable on vehicle dynamometer devices made according to the present invention, as set forth below:

DETAILED DESCRIPTION OF THE INVENTION

Figure 1:
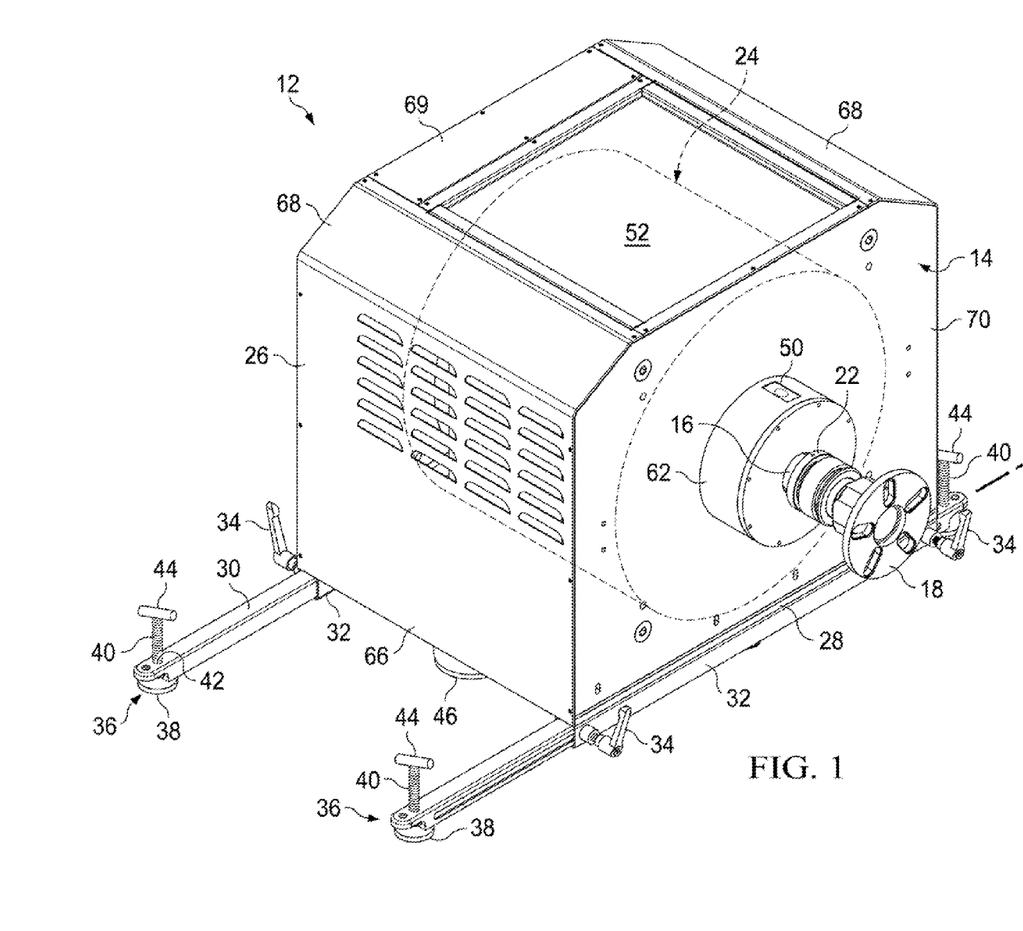
FIGS. 1 and 2 are perspective views of a portable on-vehicle dynamometer ("POD")
Figure 2:
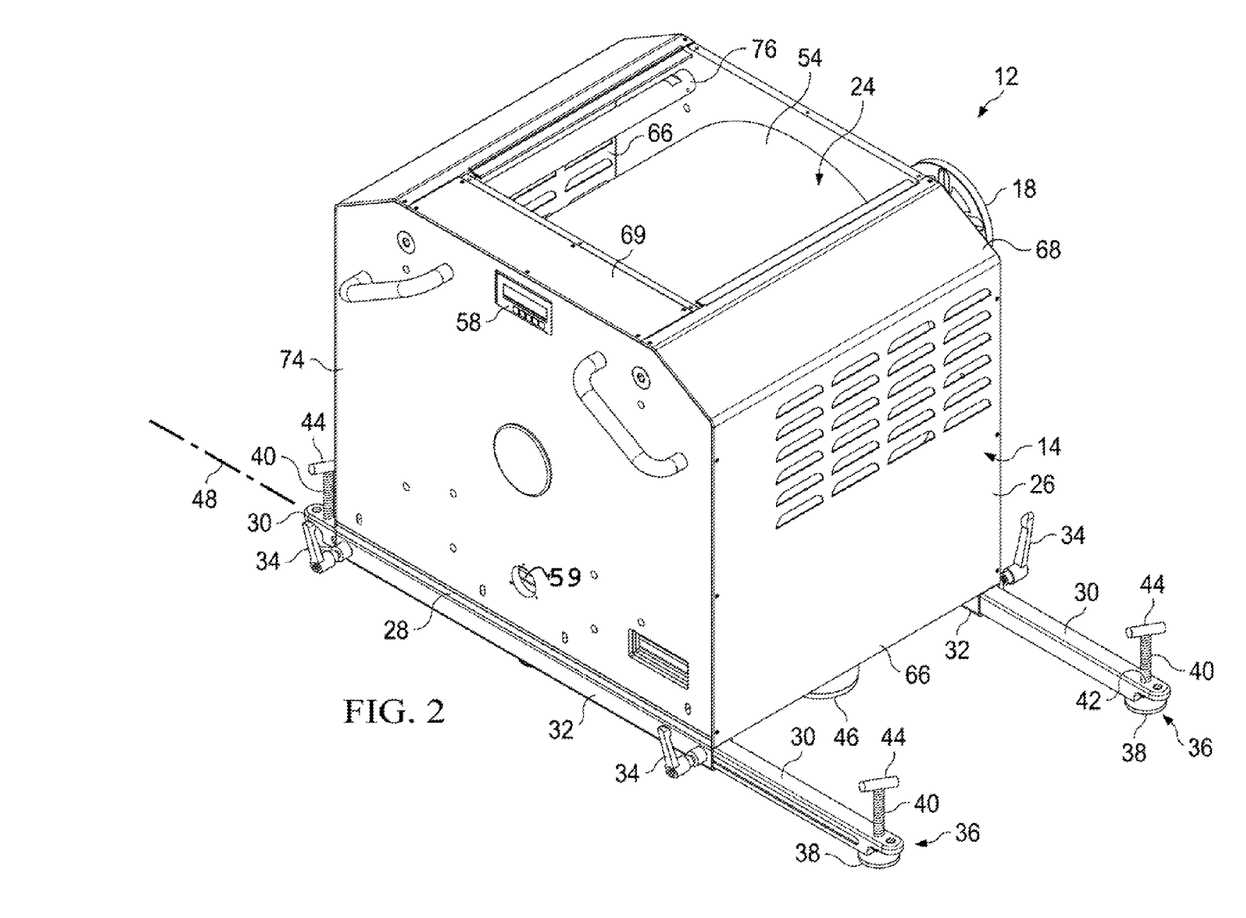

FIGS. 1 and 2 are perspective views of a portable on-vehicle dynamometer ("POD") 12 for coupling directly to an axle of the vehicle to measure the power output of the axle. The POD 12 has a housing 14 from which extends a load shaft 16. The load shaft 16 is secured with a hub coupling 18, a universal joint 20, and a quick connect 22 to an eddy current brake 24. The eddy current brake 24 preferably is of the type having a stator 56 and a rotor drum 54, but in some embodiments other types of eddy current brakes may be used, such as the eddy current brake 134 shown in FIG. 11. A hub of a wheel of a vehicle may be connected directly to the hub coupling 18 for connecting the vehicle directly to the POD 12 to determine the power output of the vehicle, without requiring jack stands and the like to support the vehicle over a conventional type dynamometer.

Figure 3:
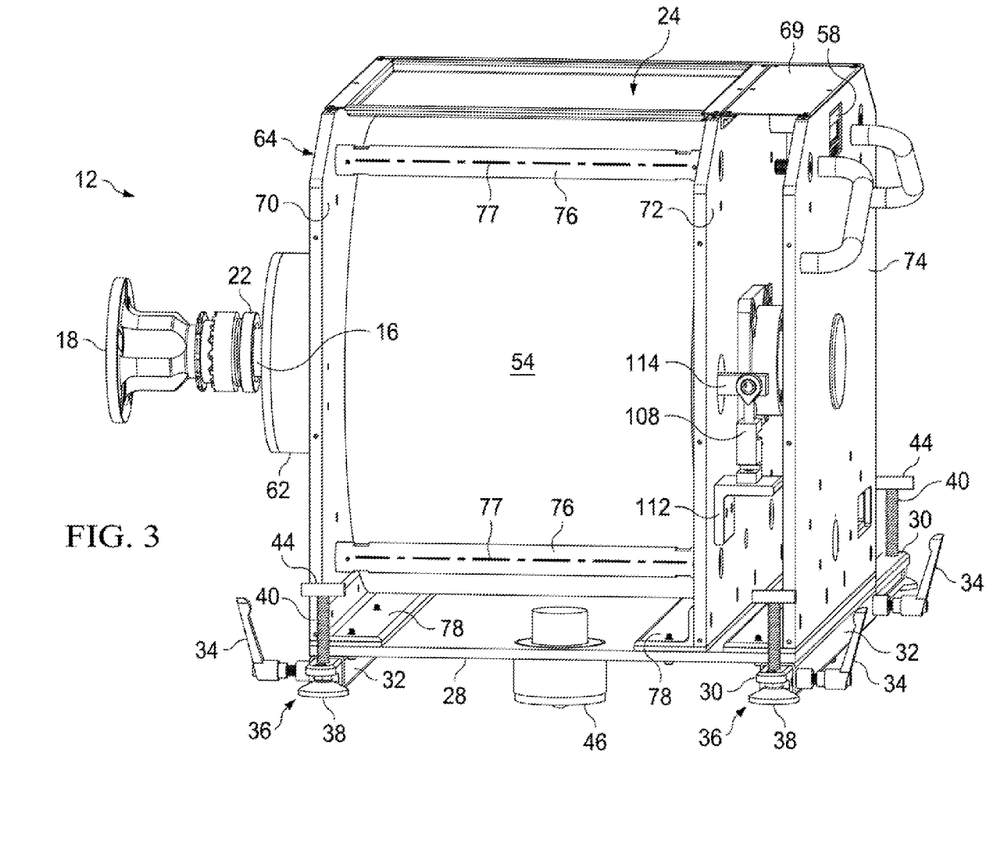
FIG. 3 is a perspective view of the POD with cover panels removed.

FIG. 3 is a perspective view of the POD 12 with two cover panels 66 and 68 removed. The housing 14 defines an enclosure 26 having a base 28. The base 28 is preferably provided by a rigid steel plate. Two receiver tubes 32 are mounted to opposite ends of a lower side of the base 28 and extend in parallel in longitudinal alignment. Four support arms 30 extend outward from open ends of the receiver tubes 32. The four support arms 30 have longitudinal axes 48 which extend parallel to a major plane of the steel plate providing the base 28. Arm locks 34 are provided for securing the support arms 30 in retracted and in extended positions. Feet assembly 36 are mounted to the outward ends of the support arms 30 and extend downward for vertically engaging a floor or a ground surface located beneath the POD 12. The feet assembly 36 have feet 38 for engaging the floor or the ground surface. The feet 38 are mounted to a lower end of a rod 40. The rod 40 extends upward from the feet 38 and fit within threaded apertures 42 formed to extend vertically within the support arms 30. In some embodiments, sleeves may be welded or otherwise secured to the outward ends of the support arms 30 to provide the threaded apertures 42. Grip handles 44 rigidly secured to respective ones of the upper ends of the rods 40 for use in turning rods 40 to extend and retract the feet assembly 36 from the outward ends of the support arms 30. The feet assembly 36 preferably have longitudinal axes defined by the rods 40 which extend perpendicular to the longitudinal axis 48 of the support arms 30 and the receiver tubes 32. Two roller assemblies 46 are mounted to the bottom of the base plate 28, spaced apart in intermediate positions between the support arms 30. The upper end of the housing 14 has a removable tray 52. Tray 52 once removed exposes a rotor drum 54 which is connected to the load shaft 16. With the tray 52 removed, a tire mounted to a wheel of a motorcycle wheel or automobile may be directly placed upon the rotor drum 54 and the POD used in conventional fashion as a dynamometer. An electric connector 58 is provided on the exterior of the POD 12 for electrically connecting the POD 12 to test equipment for determining torque, speed and power output applied to load shaft 16. An electrical plug 59 is provided to supply electrical power when the eddy current brake 24 is in use.

Figure 12:
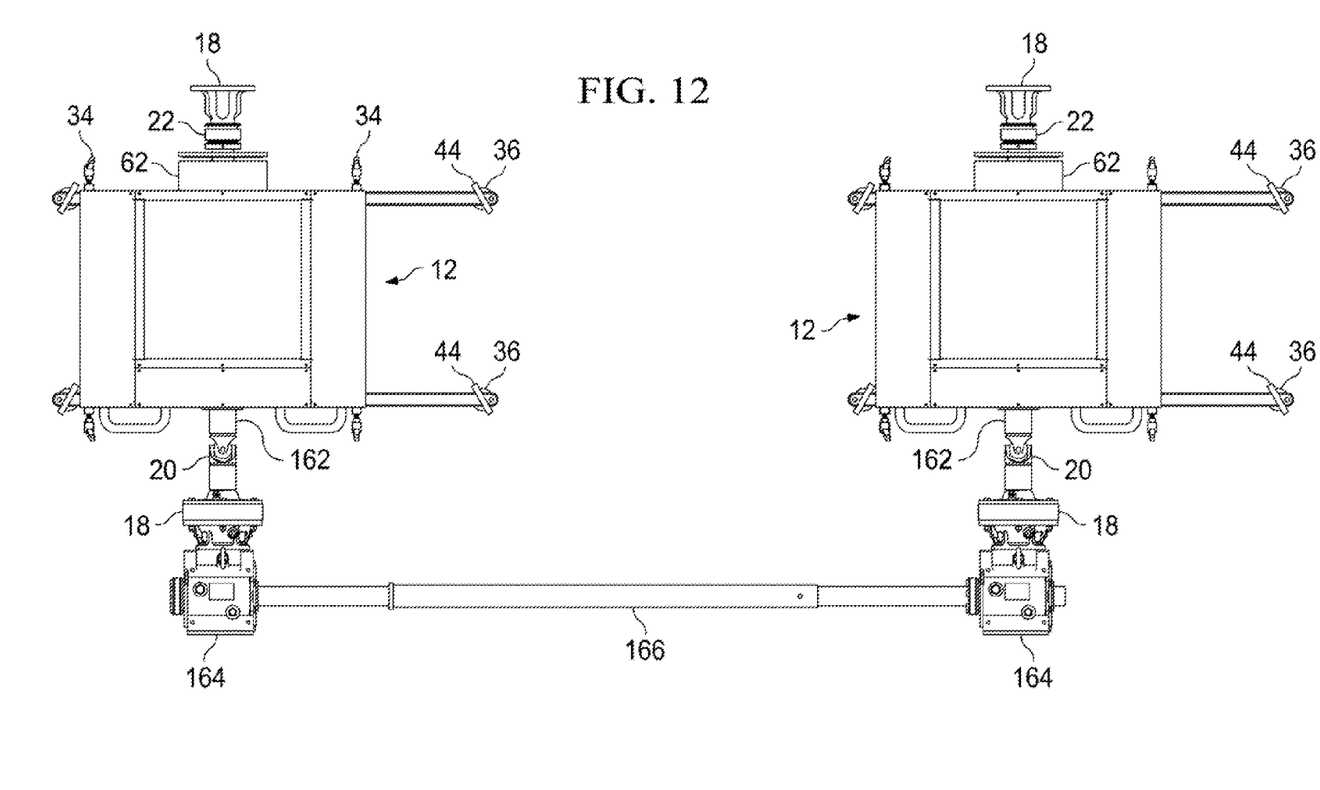
FIG. 12 is a top view of two PODS which are secured together for securing to two separate axles for determining the combined power output from the two separate axles.
Figure 13:
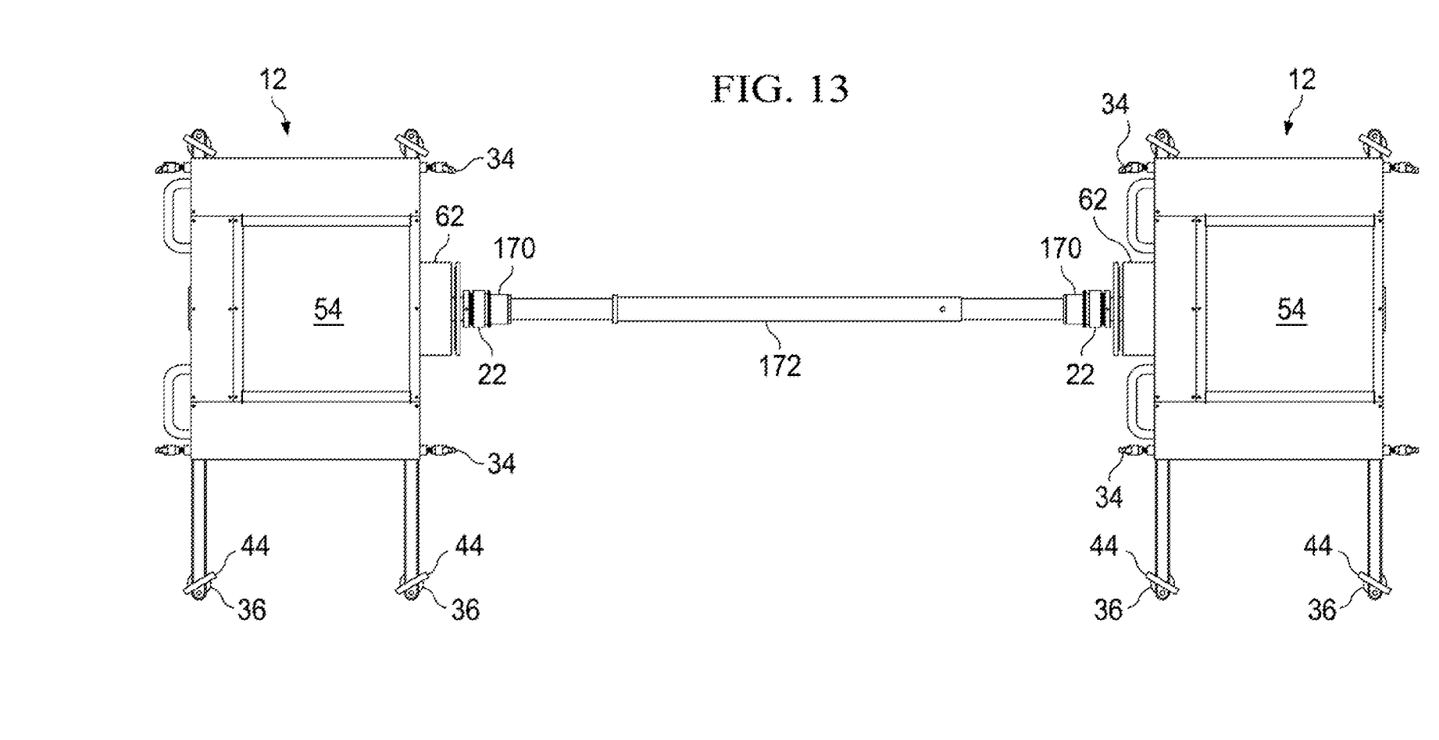
FIG. 13 is top view of two PODS which are secured together for use in a conventional chassis type dynamometer configuration.

The housing 14 has a frame 64 defined by the base plate 28, two bearing plates 70 and 72, and the end plate 74. The end plate 74 is mounted to an outward end of the base plate 28, and also provides a bearing plate when the outward end of the load shaft is used for connecting between PODS 12, as shown in FIGS. 12 and 13. Vented cover panels 66 are mounted to opposite sides of the frame 64. Cover panels 68 and 69 are provided for enclosing the frame 64. The four support rods 76 extend between the bearing plates 70 and 72 and optionally to the end plate 74 to provide a rigid support between the bearing plates 70 and 72, and the end plate 74. The support rods 76 have longitudinal axes 77 which preferably extend parallel to the upper surface of the base plate 28 and perpendicular to major planes of the bearing plates 70 and 72, and the end plate 74. Mounting brackets 78 are provided by angle iron sections for securing the bearing plates 70 and 72 and the end plate 74 in fixed, upright positions relative to the base 28. Rubber isolators 80 are provided by flat sheets of rubber, preferably one-quarter inch thick neoprene of sufficient stiffness for dampening, which are disposed between the supports 78 and the upper surface of the base plate 28 to dampen vibration there-between.

Figure 4:
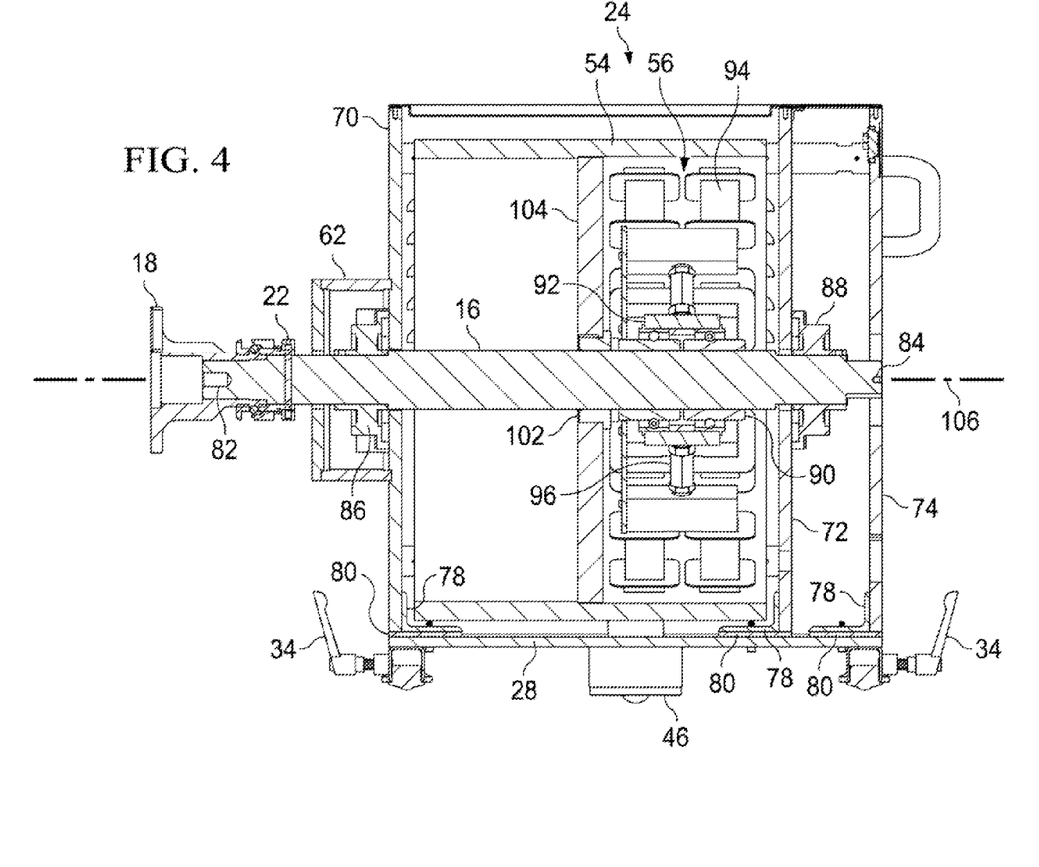
FIG. 4 is a longitudinal section view of the POD.
Figure 5:
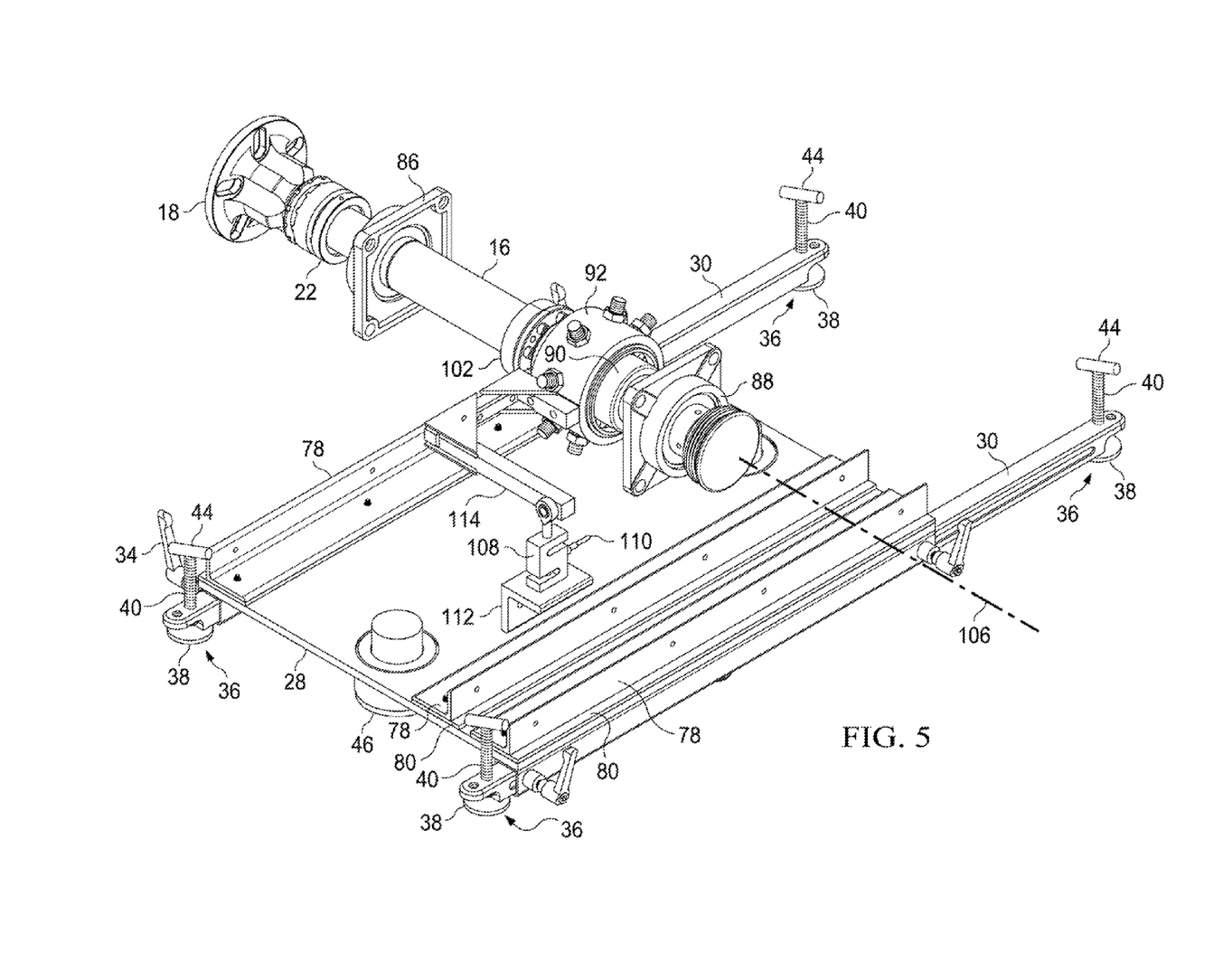
FIG. 5 is partial perspective view internal components for the POD.

FIG. 4 is a longitudinal section view and FIG. 5 is a partial perspective view of the POD 12 showing the load shaft 16 and support bearings 86 and 88 for the load shaft 16. The bearing 86 is mounted to the bearing plate 70 at the forward end of the POD 12. The bearing 88 is mounted to the bearing plate 72 toward the rearward end of the POD 12. The bearing 86 is preferably a double taper roller bearing for both thrust and axial loads. The bearing 88 is preferably either a roller bearing or a spherical ball bearing, but in some embodiments may also be a double taper roller bearing. The end plate 74 is provided for mounting a bearing for securing the outward end of the load shaft 16 to a second load shaft of a second POD. As shown in FIGS. 12 and 13. A bearing cover 62 is mounted to the exterior of the bearing plate 70 to cover the bearing 86. A bubble level 50 is mounted to the bearing cover 62 for leveling the POD 12. A stator bearing 90 is mounted around the load shaft 16 for rotatably securing the stator 56 around the load shaft 16. A mounting ring 92 is secured to the outer sleeve of the bearing 90. Stator gap adjustment sleeves 96 secure the stator coils 94 to the mounting ring 92. A coupling 102 is provided for securing a rotor plate 104 to the load shaft 16. The rotor plate 104 is a rigid plate which preferably extends with a major plane perpendicular to the longitudinal axis 106 of the load shaft 16 and the rotor drum 54. The rotor plate 104 secures the rotor drum 54 in fixed relation to the load shaft 16. The load shaft 16 and the rotor drum 54 both preferably have cylindrical exterior surfaces, with the load shaft 16 concentrically disposed within the rotor drum 54. The drum 54 is preferably made of ferrous materials and provides the rotor for the eddy current brake 24.

A load cell 108 is provided for securing the stator 56 in fixed relation relative to the housing 14. An electrical connector 110 is provided for connecting the load cell 108 to control and test circuitry for determining the power applied to the POD 12 by a power output shaft connected to the POD 12. The load cell 108 is used for determining the torque required to maintain the stator 56 in a fixed position. In the preferred embodiment a piezoelectric material is used to determine deformation of the load cell 108 under load. In other embodiments, a strain gauge may be use. The load cell 108 is connected to a load cell mounting bracket 112. The mounting bracket 112 is secured to a rearward side of the bearing plate 72. The other end of the load cell 108 is connected to a first end of a support arm 114. A second end of the support arm 114 is connected to the mounting ring 92 to which the stator 56 is secured. The stator 56 is maintained in a stationary position with respect to the bearing plate 72 by the support arm 114. A stator plate 102 is mounted to a forward end of the stator 56.

Figure 6:
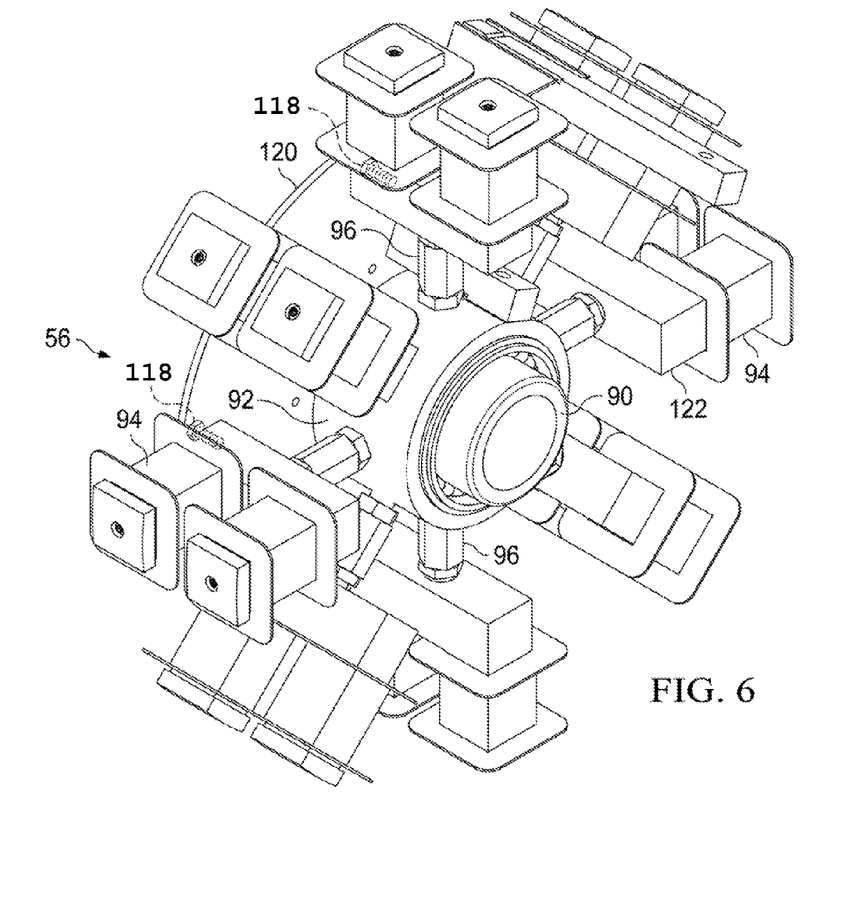
FIG. 6 is a perspective view of a stator for use in the POD.
Figure 7:
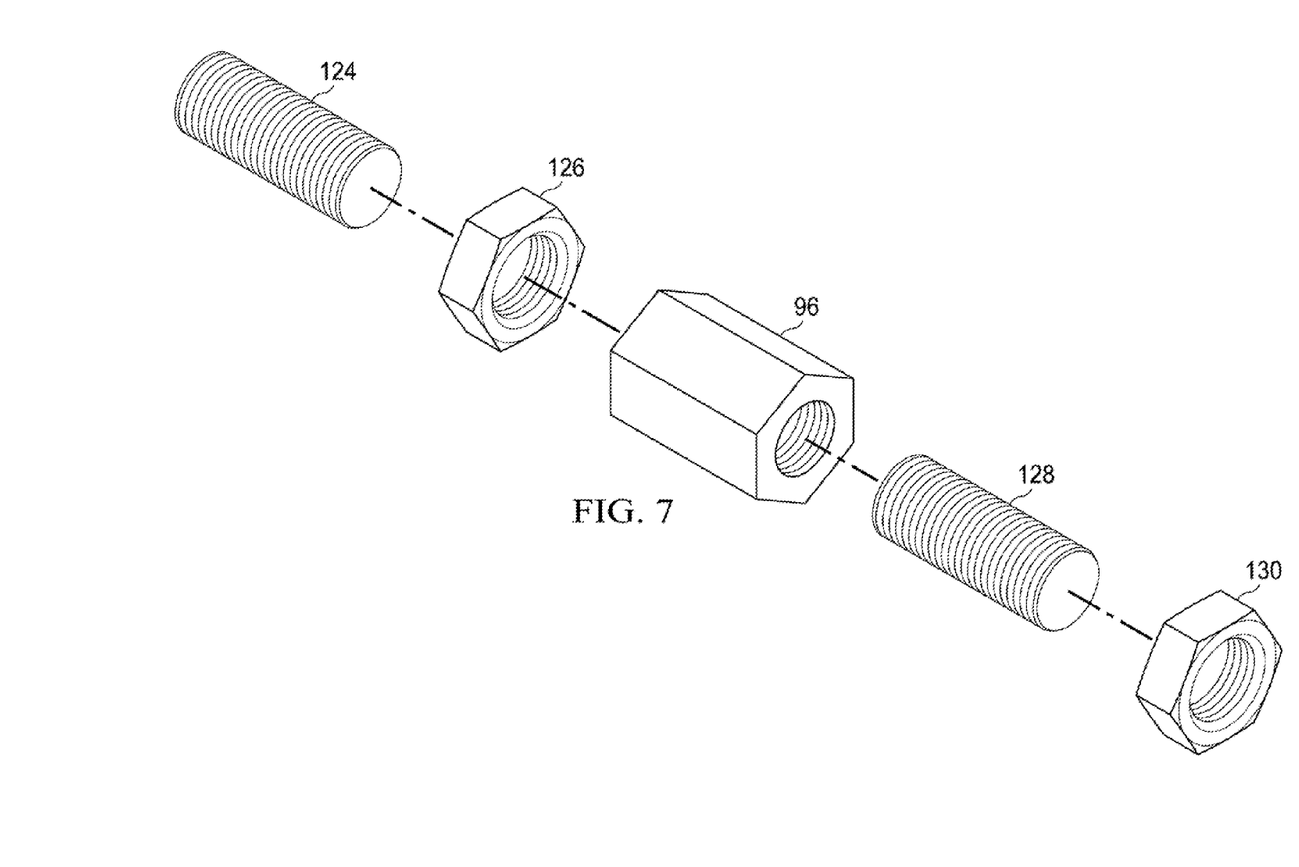
FIG. 7 is an exploded perspective view of mechanism for adjusting the gap between stator coils and a rotary drum for the POD.

FIG. 6 is a perspective view of the stator 56, and FIG. 7 is a perspective view of an adjustment sleeve 96 and lock nuts 126 and 130 for adjusting the gap between the stator coils 94 and the rotor drum 54. The stator coils 94 are secured to the mounting ring 92 such that the coils may be extended and retracted relative to the mounting ring 92 to determine the gap between the stator coils 94 and the interior surface of the rotor drum 54. A stator locking plate 120 is secured to the forward end of the bearing 90 and is secured to each of the u-shaped arms 122 by threaded connectors 118. The threaded rods 124 provide pins which are threadingly secured to apertures in the mounting ring 92. Preferably, the mounting ring 92 is cylindrical and apertures are drilled to extend radially through the circumference of the outer surface of the mounting ring 92. Lock nuts 126 are threadingly secured to the threaded rods 124. The stator gap adjustment sleeves 96 are threadingly secured to the outward ends of the threaded rods 124. Threaded rods 128 are secured to the outward ends of the stator gap adjustment sleeves 96 and lock nuts 130 are secured to the outward ends of the threaded rods 128. The threads on the rods 128 are of an opposite hand to the threads of the rods 124, such that rotation of the adjustment sleeves 96 in one direction will extend the combined length of the coupled threaded rods 124 and 128, and in a second angular direction will contract the combined length of the threaded rods 124 and 128. The adjustment sleeves 96 may be secured in fixed relation with the lock nuts 126 and 130 once the gap between the stator coils 94 and the interior of the rotor drum 54 is disposed at a preferred distance.

Figure 8:
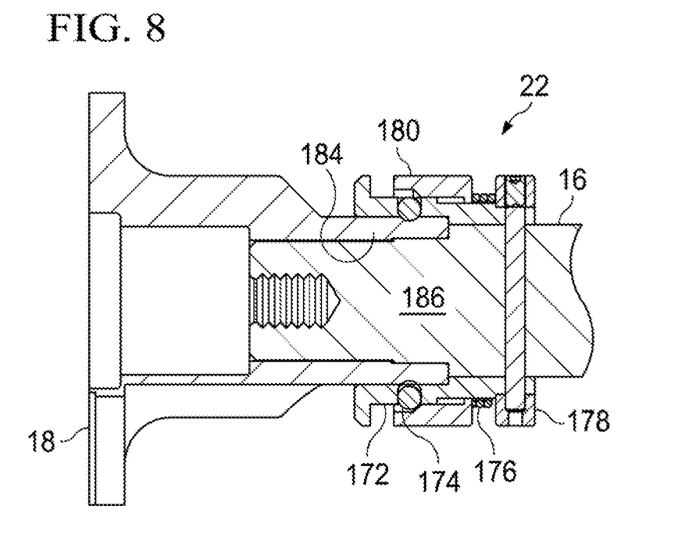
FIG. 8 is a sectional view of a quick connect for the load shaft of the POD.

FIG. 8 is a longitudinal section view of the quick connect 22, which is mounted on a first end to the load shaft 16 and on a second end to the hub coupling 18. The quick connect 22 has a tubular sleeve 172, lock balls 174 which fit directly into radially extending apertures in the sleeve 172, a bias spring 176, a retainer 178 and a slip collar 180. The slip collar 180 is biased into a forward position by the spring 176. The end 186 of the load shaft 16 and the interior of the end 184 of the hub adapter 18 are formed of a shape to provide a polygon spline type configuration as shown in FIG. 9.

Figure 9:
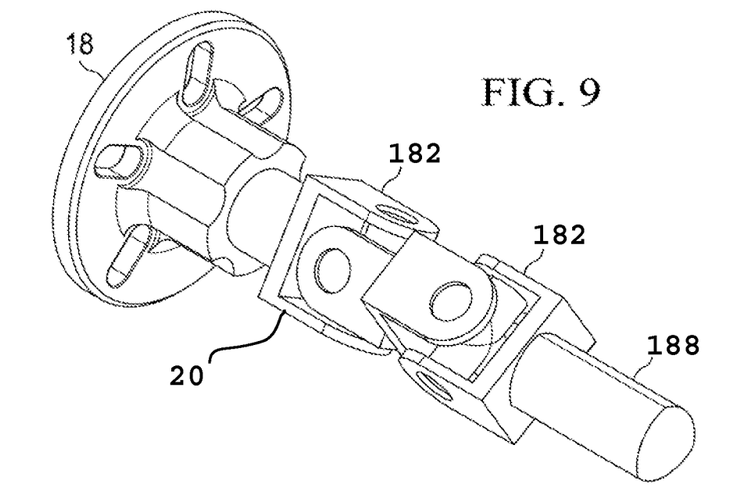
FIG. 9 is a perspective view of a double universal coupled for mounting to the load shaft of the POD.

FIG. 9 is a perspective view of a double universal joint 20 having two universal joints 182 in series, extending along a singular axis to provide two degrees of movement for misalignment. A first end has a hub coupling 18 mounted thereto. A second end 188 is formed to have a recess with a profile for providing a polygon-shaped tapered spline for coupling to a similar shape on the exterior of the end 82 of the load shaft 16. In other embodiments, other coupling means may be used, such as keyed shafts, as preferably used on the outer end 84 of the load shaft 16, or a traditional splined shafts having grooves and elongated ribs (not shown).

Figure 10:
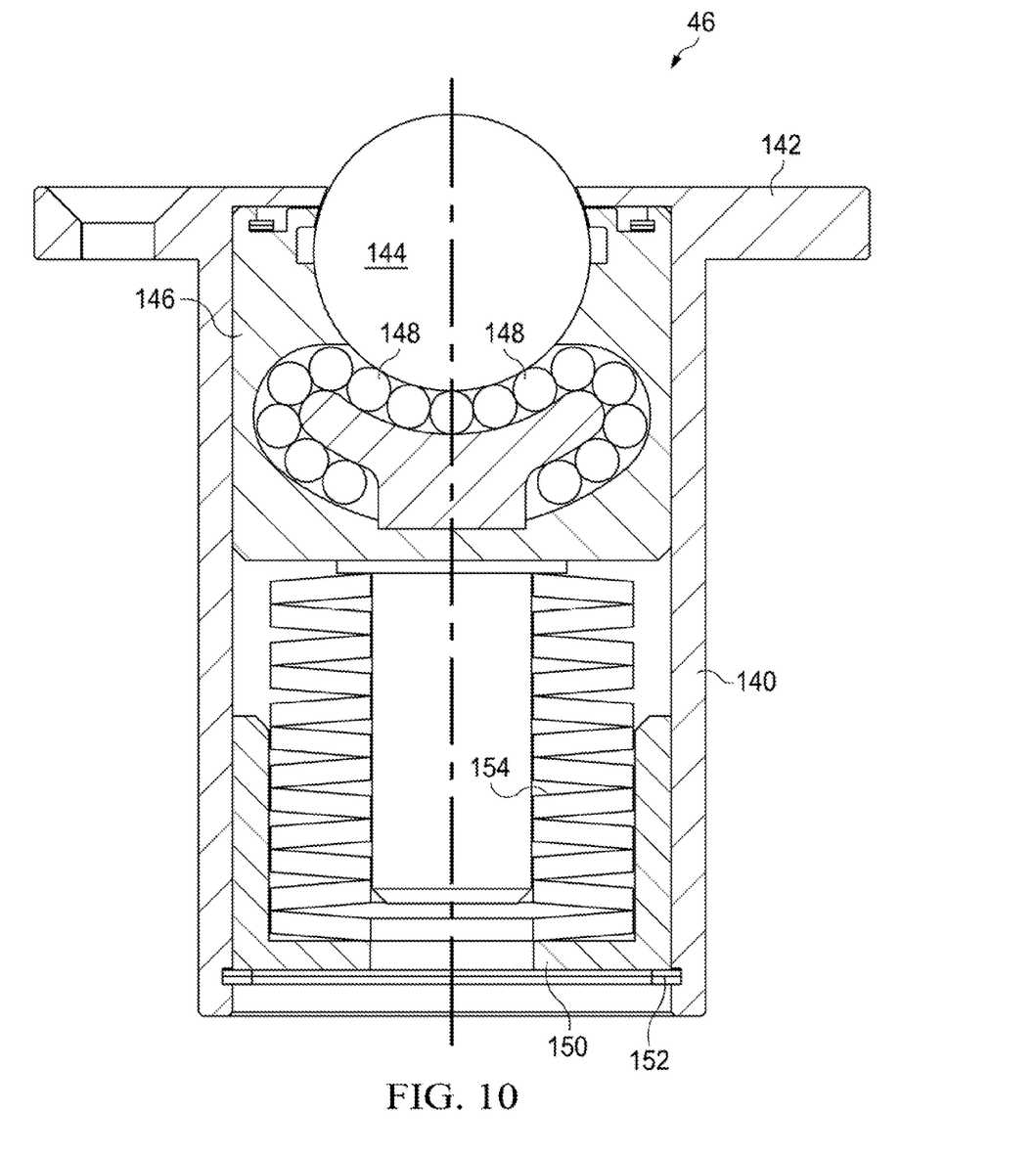
FIG. 10 is a sectional view of the roller assembly for the POD.

FIG. 10 is a longitudinal section view of the roller assembly 46. The roller assembly 46 has a cylindrically shaped housing 140 having a mounting flange 142 on a lower end. The mounting flange 142 secures the roller assembly 46 to the underside of the base plate 28. A support ball 144 extends outward of the lower end of the housing 142 for engaging a ground surface beneath the base plate 28 to support the weight of the POD 12.

A block 146 is disposed within the housing 140, having an end which fits against the support ball 144. A bearing assembly 148 is provided in the block 146 to allow the support ball 144 to move freely. A washer spring assembly 154 is provided in the upper end of the housing 140. A retainer 150 secures the belleville washer spring assembly 154 in position. A retainer ring 152 secures the retainer 150 in position within the housing 140.

Figure 11:
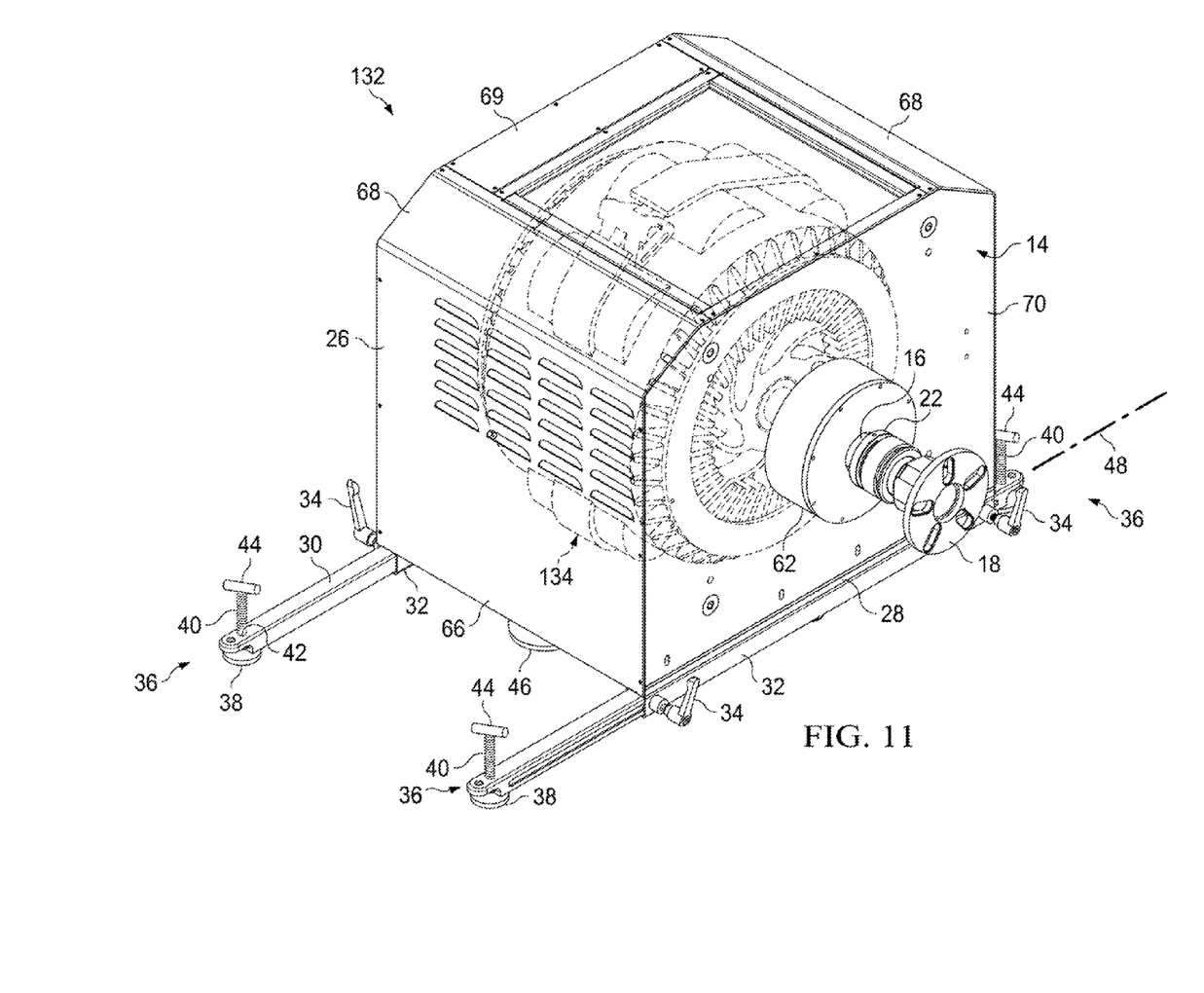
FIG. 11 is a perspective view of an alternative POD having a conventional eddy current brake mounted therein.

FIG. 11 is a perspective view of an alternative POD 132 having a conventional eddy current brake 134 mounted therein, rather than the eddy current brake 24 shown in FIGS. 3 and 4. The conventional eddy current brake 134 may be used in place of the eddy current brake 24 of FIGS. 3 and 4, in other embodiments of the present invention.

FIG. 12 is a perspective view of two PODS 12 which are secured together for securing to two separate axles for determining the combined power output from the two separate axles of an all-wheel drive vehicle. The PODS 12 have connectors 162 which are secured to the outward ends of respective ones of the load shaft 16. Ninety degree gear boxes 164 connect to the PODS 12 and are connected together by a coupling shaft 166.

FIG. 13 is a top view of two PODS 12 connected together for use in typical fashion as a chassis dynamometer. The rotor drums 54 are exposed such that two drive tires may be placed directly atop the rotor drums 54 of the two PODS 12. Two adapters 170 are provided on opposite ends of a connecting shaft 172 for connecting to the quick connects 22 and directly to the load shafts 16 of the two PODS 12. The connecting shaft 172 is may be selectively extended and retracted to accommodate different spacings between the two PODS 12.

Figure 14:
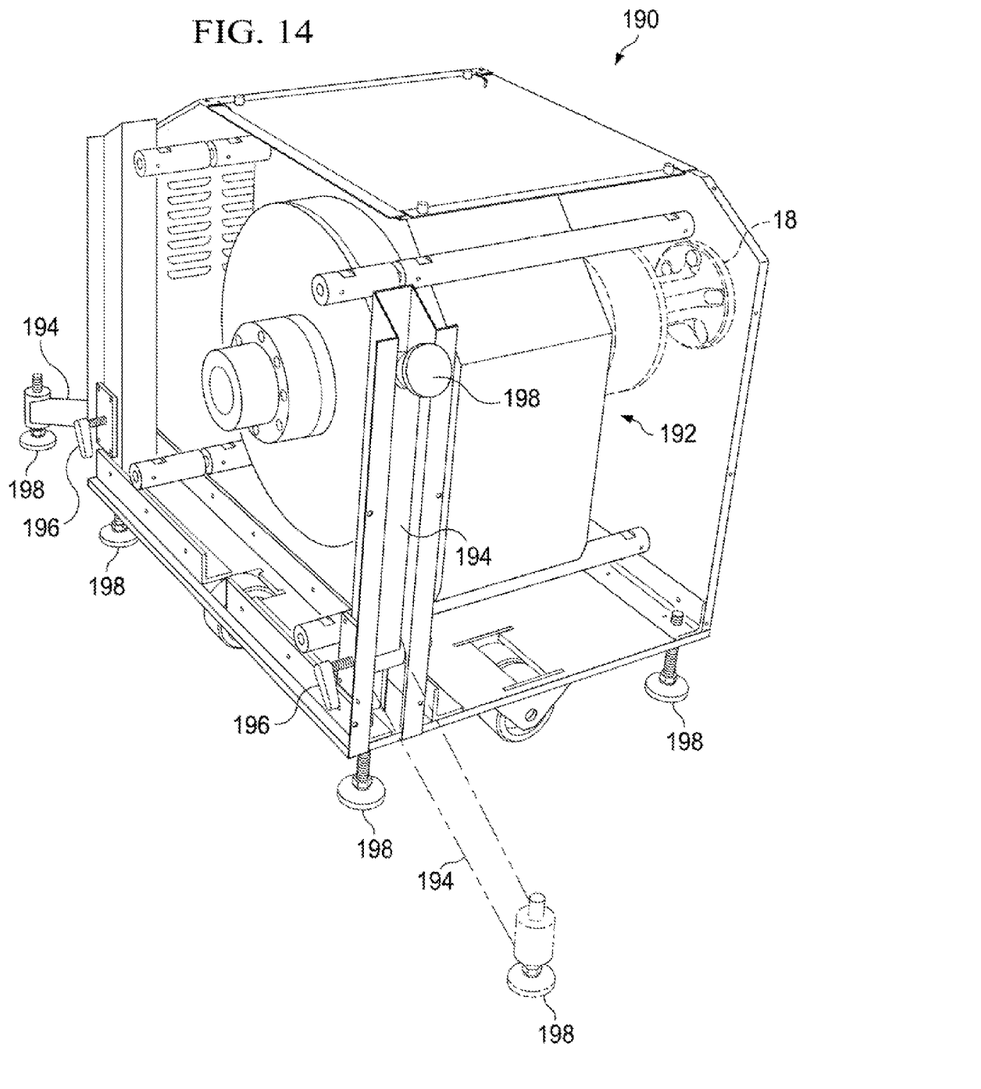
FIG. 14 is an alternative POD having angled support arms which pivotally extend to provided support for the POD.

FIG. 14 is a perspective view of an alternate configuration for a POD 190 having a conventional eddy current brake 192, rather than a rotary drum which extends exteriorly around a stator having electric coils mounted to the stator. The POD 190 has two support legs 194 which are pivotally secured within a vertically disposed channel for storage, and then which may be extended downward for supporting the POD 190. The support legs 194 have support feet 198 on the outward ends. Support leg locks 196 are threaded members which are tightened to secure the support legs 194 in downward positions during use of the POD 190, and to retainer the support legs 194 in storage positions.

Thus the advantages of this invention provides a compact dynamometer which may be stored in small spaces when not in use. One POD can be used for a solid or live axle [locker spool type, in which both axles are locked)] vehicle where both wheels rotate with the same torque and speed or two pods are used where the axle of the car is a limited slip or similar type axle. In an all wheel drive scenario the front and rear pods have the capability to be mechanically linked together via a coupling and right angle gear box assembly or similar, using the opposite ends of the load shafts not connected to the wheel hub being tested. Support arms are extended to provide a wider footprint for the POD and assist in providing leverage for the torsional forces when in use. The support arms can be folded or retracted when not in use to allow for compact storage. The eddy current brake of the PODS according to the present invention may have sufficient rotor mass that the unit can be used as an inertia type dynamometer without having the eddy brake stator energized. The benefit of this is that if in an area without power, the system can be used to accelerate a known inertial mass of the rotor using and computing the torque and horsepower according to the formula: Torque=Inertia×Angualar acceleration. The Inertia is known for the rotor drum, and the angular acceleration is calculated by a shaft encoder sensor. The POD can change angle to allow for misalignment in the vehicles suspension via leveling pads/feet and tilting or rotating among its castors/ball castors, and such. A tire for a motorcycle, ATV, or vehicle's tire can directly be place on rotor drum for the POD to function as traditional chassis dynamometer. The unit is compact enough to allow doors on a vehicle to open and close when bolted on the vehicle.

Although the preferred embodiment has been described in detail, it should be understood that various changes, substitutions and alterations can be made therein without departing from the spirit and scope of the invention as defined by the appended claims.

What is claimed is:

1. A portable on vehicle dynamometer for determining power output from a drive shaft, comprising:
   a rigid frame;
   a load shaft rotatably coupled to said rigid frame;
   an eddy current brake having a stator connected to said rigid frame, and a rotor connected to said load shaft;
   a hub coupling secured to a first end of said load shaft and connected directly to the drive shaft for transferring power to the load shaft, wherein said hub coupling, said drive shaft and said load shaft co-axially rotate;
   said rigid frame having two outwardly extending support arms, and arm locks which secure said outwardly extending support arms in fixed positions;
   support feet assemblies mounting to respective ones of outer ends of said support arms; and
   two roller assemblies mounted to a lower end of said rigid frame, providing multidirectional movement of said dynamometer.

2. The portable on vehicle dynamometer according to claim 1, wherein said rotor of said eddy current brake comprises a cylindrically-shaped rotor drum extending exteriorly around said stator, and said stator comprises a plurality of stator coils extending exteriorly around said load shaft, spaced apart from an interior of said rotor drum.

3. The portable on vehicle dynamometer according to claim 2, further comprising a stator bearing interiorly secured to said drive shaft and exteriorly secured to said stator.

4. The portable on vehicle dynamometer according to claim 3, wherein said eddy current brake is a conventional style eddy current brake, having eddy plates which extend perpendicular to said load shaft and face electric coils.

5. The portable on vehicle dynamometer according to claim 4, further comprising said rotor having sufficient mass for operation of said eddy current break without power to determine the power output from the drive shaft.

6. The portable on vehicle dynamometer according to claim 5, further comprising a quick-disconnect coupler for securing a hub adapter there-to for mating to drive shaft hub.

* * * * *